United States Patent
Bolle et al.

(10) Patent No.: US 7,219,704 B2
(45) Date of Patent: May 22, 2007

(54) FUEL TANK FOR A MOTOR VEHICLE

(75) Inventors: Dirk Bolle, Bonn (DE); Volker Treudt, Windeck (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 11/201,598

(22) Filed: Aug. 11, 2005

(65) Prior Publication Data

US 2006/0032546 A1    Feb. 16, 2006

(30) Foreign Application Priority Data

Aug. 11, 2004    (DE)    ............ 10 2004 039 163

(51) Int. Cl.
*B65B 1/04* (2006.01)
*F02M 37/20* (2006.01)

(52) U.S. Cl. .......... 141/286; 141/59; 141/65; 141/302; 141/308; 123/516; 123/520

(58) Field of Classification Search ............ 141/59–65, 141/285, 286, 302, 308; 137/587, 588; 123/518–521; 220/86.2

See application file for complete search history.

(56) References Cited

U.S. PATENT DOCUMENTS

| | | | |
|---|---|---|---|
| 5,456,238 A | 10/1995 | Horiuchi et al. | ............ 123/520 |
| 5,564,398 A | 10/1996 | Maeda et al. | |
| 5,850,819 A * | 12/1998 | Kunimitsu et al. | ......... 123/520 |
| 6,230,693 B1 | 5/2001 | Meiller et al. | |
| 6,237,574 B1 | 5/2001 | Jamrog et al. | |
| 2004/0031469 A1 | 2/2004 | Reddy | |

FOREIGN PATENT DOCUMENTS

| | | |
|---|---|---|
| EP | 1 052 130 A2 | 11/2000 |
| EP | 1332906 | 8/2003 |
| JP | 1125552 | 5/1989 |
| JP | 7151022 | 6/1995 |
| JP | 7233766 | 9/1995 |
| WO | WO 97/33765 | 9/1997 |

OTHER PUBLICATIONS

European Office Action dated Mar. 31, 2006 received in corresponding European Patent Application No. 05015487.1 (4 pages).

* cited by examiner

*Primary Examiner*—Timothy L. Maust
(74) *Attorney, Agent, or Firm*—Grossman, Tucker, Perreault & Pfleger, PLLC

(57) ABSTRACT

A fuel tank for a motor vehicle, conveys fuel from the tank to an internal combustion engine of the vehicle, and includes a filling connection with a filling opening. The tank comprises an improved venting arrangement for venting the tank during refuelling and during operation thereof, with at least one fuel vapor filter by way of which the fuel tank is vented. The fuel vapor filter is of a two-stage configuration having first and second filter stages in the direction of flow in venting. A refuelling venting conduit is branched off after the first filter stage and is communicatable with the atmosphere or the tank interior.

10 Claims, 3 Drawing Sheets

FUEL TANK FOR A MOTOR VEHICLE

CROSS-REFERENCES TO RELATED APPLICATIONS

This application claims the priority of German patent application Serial No 10 2004 039 163.7 filed Aug. 11, 2004, the subject-matter of which is incorporated herein by reference.

FIELD OF THE INVENTION

The invention concerns a fuel tank and more particularly a fuel tank for use in a motor vehicle having an internal combustion engine.

BACKGROUND OF THE INVENTION

A typical fuel tank for use in a motor vehicle for supplying fuel to the internal combustion engine thereof includes means for conveying fuel from the tank to the engine, and a filling connection usually in the form of a pipe which extends from the tank to a filling opening for refuelling of the tank. The tank further includes means for venting thereof during refuelling and during operation of the tank, which means can be referred to hereinafter for brevity as means for refuelling and operational venting. The tank further includes a fuel vapor filter by way of which venting of the fuel tank is effected.

In such a fuel tank the fuel vapor filter by way of which refuelling and operational venting is effected is usually in the form of an activated carbon filter. The hydrocarbon-charged gases from the fuel tank are condensed in the fuel vapor filter, hydrocarbons are retained in the activated carbon contained in the filter and the air cleaned in that way is discharged to the ambient atmosphere. When the fuel vapor filter is saturated with hydrocarbons, purging thereof is effected by the engine induction air being passed by way of the fuel vapor filter.

Basically it is desirable for the fuel vapor filter to be designed in such a way that as far as possible no hydrocarbons reach the atmosphere. In spite of the fuel vapor filter operating well however it is not possible to completely avoid that. The impurities which pass into the atmosphere through the fuel vapor filter are also referred to in this technical field as 'bleed emissions'.

Therefore inter alia certain limits are set on the level of efficiency of the fuel vapor filter for the reason that, in a tank refuelling operation, depending on the respective filling speed, up to 60 l/minute of gas has to be displaced out of the fuel tank. That volume flow is passed by way of the fuel vapor filter. The higher the level of efficiency of the filter, the correspondingly higher is also the through-flow resistance thereof, so that the fuel vapor filter must afford a certain minimum flow transfer capability for the fuel vapors to flow therethrough in order to prevent the refuelling gun from prematurely switching off in the refuelling procedure.

In order to keep the flow through the fuel vapor filter at a comparatively low level and thus also to maintain the vapor loading thereof within certain limits in the refuelling procedure, it is known for a certain proportion of the gas volume flow which is displaced from the tank in the refuelling operation to be recirculated through the filling pipe, more especially through a conduit specifically provided for that purpose and referred to as a recirculation conduit. It will be noted however that such an arrangement does not make it possible to design the fuel vapor filter without having regard to the high gas volume flow which is to be displaced in the refuelling operation, in order to reduce the bleed emissions of the fuel vapor filter, especially as the structural volume of the filter is also subject to certain limits.

SUMMARY OF THE INVENTION

An object of the present invention is to provide a fuel tank, more particularly for a motor vehicle, comprising an improved venting arrangement.

Another object of the present invention is to provide a fuel tank for a motor vehicle including a fuel vapor filter which is designed to afford better adaptability to different conditions of the tank in various operating states.

Still another object of the present invention is to provide a motor vehicle fuel tank which is of an improved design in terms of pollutant emissions to the atmosphere.

In accordance with the principles of the present invention the foregoing and other objects are attained by a fuel tank for a motor vehicle, comprising means for conveying fuel therefrom to an internal combustion engine, a filling connection affording a fuel filling opening, means for operational and refuelling venting of the tank, and at least one fuel vapor filter, by way of which venting of the fuel tank is effected. The fuel vapor filter is of a two-stage nature comprising first and second filter stages in the direction of venting flow. The first filter stage is of a lower flow resistance therethrough than the first and second filter stages or the second filter stage, while a refuelling venting conduit is branched off behind the first filter stage.

As will be seen from the description of preferred embodiments set forth hereinafter, the invention can be summarised to the effect that the fuel vapor filter includes an additional filter stage, by way of which only operational venting of the tank takes place. During a refuelling phase therefore refuelling venting takes place by way of the first filter stage. That arrangement means that it is possible to design the second filter stage, without having regard to the demands involved in the refuelling operation. In other words, the second filter stage can certainly also involve a higher flow resistance than the first filter stage as no vapors flow through it during the refuelling operation. The gases which are displaced by the fuel being introduced into the tank in the refuelling operation are passed only by way of one filter stage of the fuel vapor filter, whereas during operation of the internal combustion engine of the motor vehicle which is supplied with fuel from the tank the hydrocarbon-charged gases emitted by the fuel tank flow through both stages of the fuel vapor filter, thereby making it possible to achieve a considerable reduction in the level of hydrocarbon emissions discharged to the atmosphere by the fuel vapor filter.

In a preferred feature the second filter stage is in the form of a fine cleaning stage. The flow resistance of the second filter stage can correspond to that of the first filter stage so that the flow resistance through the two stages of the fuel vapor filter is increased in total, but it is also possible to provide that, as just mentioned hereinbefore, the second filter stage is in the form of a fine cleaning stage, in which case the flow resistance of the second filter stage is higher than that of the first filter stage.

In a further preferred feature of the invention, the fuel tank includes a switchable refuelling valve operatively disposed between the first filter stage and the refuelling venting conduit, whereby the refuelling venting conduit communicates with the atmosphere downstream of the first filter stage, by way of the switchable refuelling valve. That refuelling valve can be closed in the non-actuated condition. If the refuelling valve is closed during normal operation of the internal combustion engine of the motor vehicle, then the gases produced in the fuel tank by virtue of fluctuations in temperature and surge movements therein are passed entirely by way of the first and second stages of the fuel vapor filter.

In a further preferred feature of the invention, an operational venting conduit is connected to the second filter stage, that conduit communicating with the atmosphere by way of a switchable diagnosis valve which is open in the non-actuated condition. When the diagnosis valve is closed the second filter stage is shut off and the gases issuing from the fuel tank are now passed only by way of the first filter stage and the refuelling venting conduit.

Instead of a refuelling valve in the refuelling venting conduit, the refuelling venting conduit can communicate with the filling connection such as a filler pipe, so that there the tank closure performs the function of the refuelling valve. When the tank closure is fitted to the filling opening of the tank, the refuelling venting conduit is closed with respect to the atmosphere and all gases discharged from the tank are passed by way of the first and second stages of the fuel vapor filter.

In that respect, in accordance with a further preferred feature of the invention, the refuelling venting conduit communicates with the filling connection upstream, in the direction of flow of the fuel to be filled into the tank, of a sealing means for sealingly co-operating with the refuelling gun or a holder in which the refuelling gun fits in the refuelling operation. In that way, the cleaned air which issues from the refuelling venting conduit in the tank refilling operation is not recirculated through the tank.

Another preferred feature of the invention provides that a check valve is disposed in the refuelling venting conduit downstream of the fuel vapor filter, in order to prevent a back-flow of the fuel vapors from the filling connection or pipe into the fuel vapor filter.

It is possible to dispense with the check valve if the tank closure is so designed that it also provides for closing off the mouth opening of the refuelling venting conduit.

In a variant of the fuel tank according to the invention, the diagnosis valve in the operational venting conduit can be closed in the non-actuated condition, that valve then being bridged by way of a pressure-maintaining valve. The second filter stage or the operational venting conduit is closed off by way of the pressure-maintaining valve.

In a further preferred feature the tank can include a check valve in the operational venting conduit in parallel relationship with the pressure-maintaining valve, to permit purging of the fuel vapor filter during operation of the motor vehicle with its internal combustion engine.

Further objects, features and advantages of the invention will be apparent from the description hereinafter of two preferred embodiments thereof.

DESCRIPTION OF THE PREFERRED EMBODIMENTS

Figure 1:
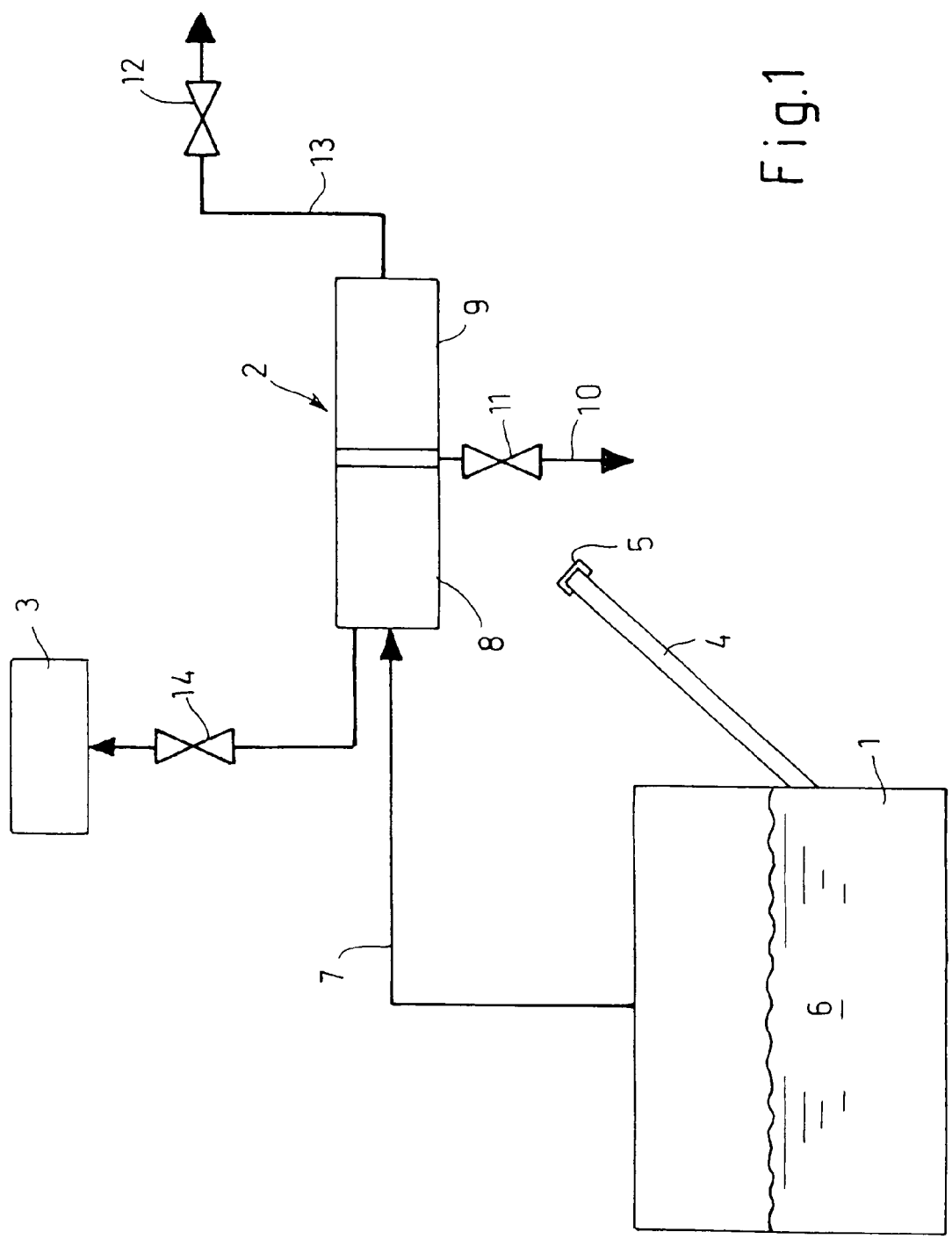
FIG. 1 is a diagrammatic view of a fuel tank according to the invention with venting thereof, in a first embodiment.

Referring generally to the drawing, reference numeral 1 diagrammatically denotes a fuel tank in conjunction with a fuel vapor filter 2 and an internal combustion engine 3 of a motor vehicle on which the fuel tank 1 is used. The fuel vapor filter 2 and associated lines as well as appropriate valves are constituent parts of the fuel tank 1, and they do not necessarily have to be arranged outside the fuel tank 1 but rather they can also be arranged within the interior thereof. For the sake of enhanced clarity of the drawing in this case for example the arrangement of the fuel vapor filter 2 and the corresponding lines and valves are shown as being outside the internal volume of the tank 1.

Referring now more specifically to FIG. 1, the fuel tank 1 is usually filled with fuel by way of a filling connection 4, for example in the form of a filler pipe, having a tank closure indicated at 5 in the form of a cap, for suitably closing the filling opening of the filling connection 4. In a refuelling operation, the fuel 6 which is introduced into the tank 1 displaces the air/fuel vapor mixture which is to be found above the level of the fuel 6 in the tank 1 and which accordingly passes to the fuel vapor filter 2 by way of a venting conduit 7.

In accordance with the invention, the fuel vapor filter 2 includes a first filter stage diagrammatically indicated at 8 and a second filter stage diagrammatically indicated at 9. Behind the first filter stage 8, that is to say downstream thereof in the direction of flow of the air/fuel vapor mixture through the fuel vapor filter 2, a refuelling venting conduit 10 is taken directly to the ambient atmosphere, in the embodiment illustrated in FIG. 1.

The refuelling venting conduit 10 can be closed off by way of a refuelling valve diagrammatically indicated at 11. That refuelling valve 11 is closed in the non-actuated condition. When a refuelling operation is initiated, the refuelling valve 11 is opened, for example by virtue of opening of the tank closure 5, so that the gas volume which is displaced out of the fuel tank 1 due to the refuelling operation is passed exclusively by way of the first filter stage 8 and is discharged into the atmosphere in a cleaned condition by way of the refuelling venting conduit 10. In this procedure the second filter stage 9 can be shut off by means of a diagnosis valve indicated at 12 in an operational venting conduit 13, so that the entire amount of gas displaced in the refuelling operation is passed by way of the first filter stage 8. That is not necessarily required, but rather the diagnosis valve 12 can also be opened so that the amount of gas passed by way of the first filter stage 8 is then adjusted according to the flow resistances of the filter stages 8 and 9.

In the embodiment described with reference to FIG. 1, the second filter stage 9 is in the form of a fine cleaning stage with a markedly higher flow resistance therethrough than the first filter stage 8. Alternatively the flow resistance of the second filter stage 9 can correspond to the flow resistance of the first filter stage 8 so that overall the flow resistance of the two filter stage 8 and 9 is increased. In this case also the cleaned gas which is displaced from the tank in the refuelling operation, with the refuelling valve 11 in the open condition, would be discharged by way of the refuelling venting conduit 10 to the atmosphere, even when the diagnosis valve 12 is open.

In operation of the internal combustion engine of the motor vehicle, the diagnosis valve 12, after the fuel tank 1 has been tested for sealing integrity, is opened, whereas the refuelling valve 11 is closed.

The diagnosis valve 12 serves to hermetically seal off the fuel tank 1 for the purposes of testing sealing integrity, using the appropriate on-board diagnosis procedure, in order to produce an increased pressure or a reduced pressure therein. If it is not possible to hold the preselected increased pressure or reduced pressure, then the tank arrangement is suffering from a leak.

Gases which are produced in the tank 1 during operation of the motor vehicle due to surge movements on the part of the fuel 6 in the tank or due to temperature fluctuations are discharged to the atmosphere in a cleaned condition by way of the venting conduit 7 and by way of the first and second stages 8 and 9 of the fuel vapor filter 2 and then by way of the operational venting conduit 13.

Reference 14 denotes a purge valve which opens the purge conduit 15 to the internal combustion engine 2, more specifically for regeneration of the fuel vapor filter 2. In this case, combustion air is drawn in by the internal combustion engine 3 by way of the operational venting conduit 13 and the fuel vapor filter 2.

Figure 2:
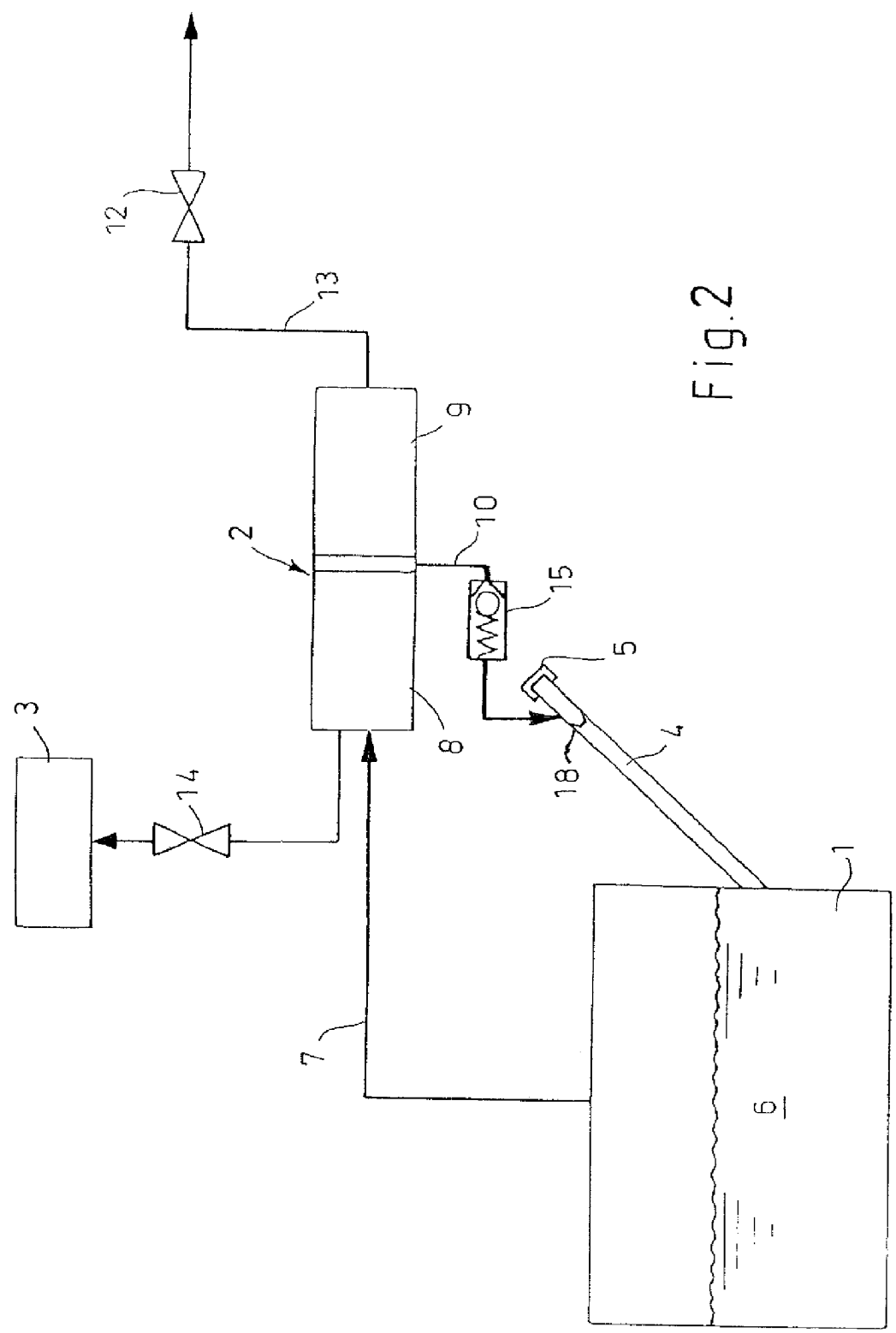
FIG. 2 shows a second embodiment of the fuel tank according to the invention.

Referring now to FIG. 2 the second embodiment of the fuel tank 1 according to the invention differs from the FIG. 1 embodiment in that the refuelling venting conduit 10 in the FIG. 2 embodiment does not have a switchable refuelling valve as indicated at 11 in FIG. 1. Rather, in this case the refuelling venting conduit 10 communicates with the filling connection 4, more specifically just below the tank closure 5 and, in the direction of flow of fuel which is introduced into the tank 1 through the filling connection 4, above a sealing means 18 which sealingly co-operates with a refuelling gun introduced into the filling opening of the filling connection 4 or above a holder 19 for receiving the filling gun in that position. In this case the tank closure 5 performs the function of the above-described switchable refuelling valve 11. When after a refuelling operation the tank closure 5 is fitted on to the filling connection 4 again, the refuelling venting conduit 10 is closed so that the fuel vapors which are then given off by the fuel tank 1 are passed by way of the first and second filter stages 8 and 9 of the fuel vapor filter 2.

Reference 15 identifies a check valve provided in the refuelling venting conduit 10 to prevent a backflow of fuel vapors from the filling connection 4 into the fuel vapor filter 2.

Figure 3:
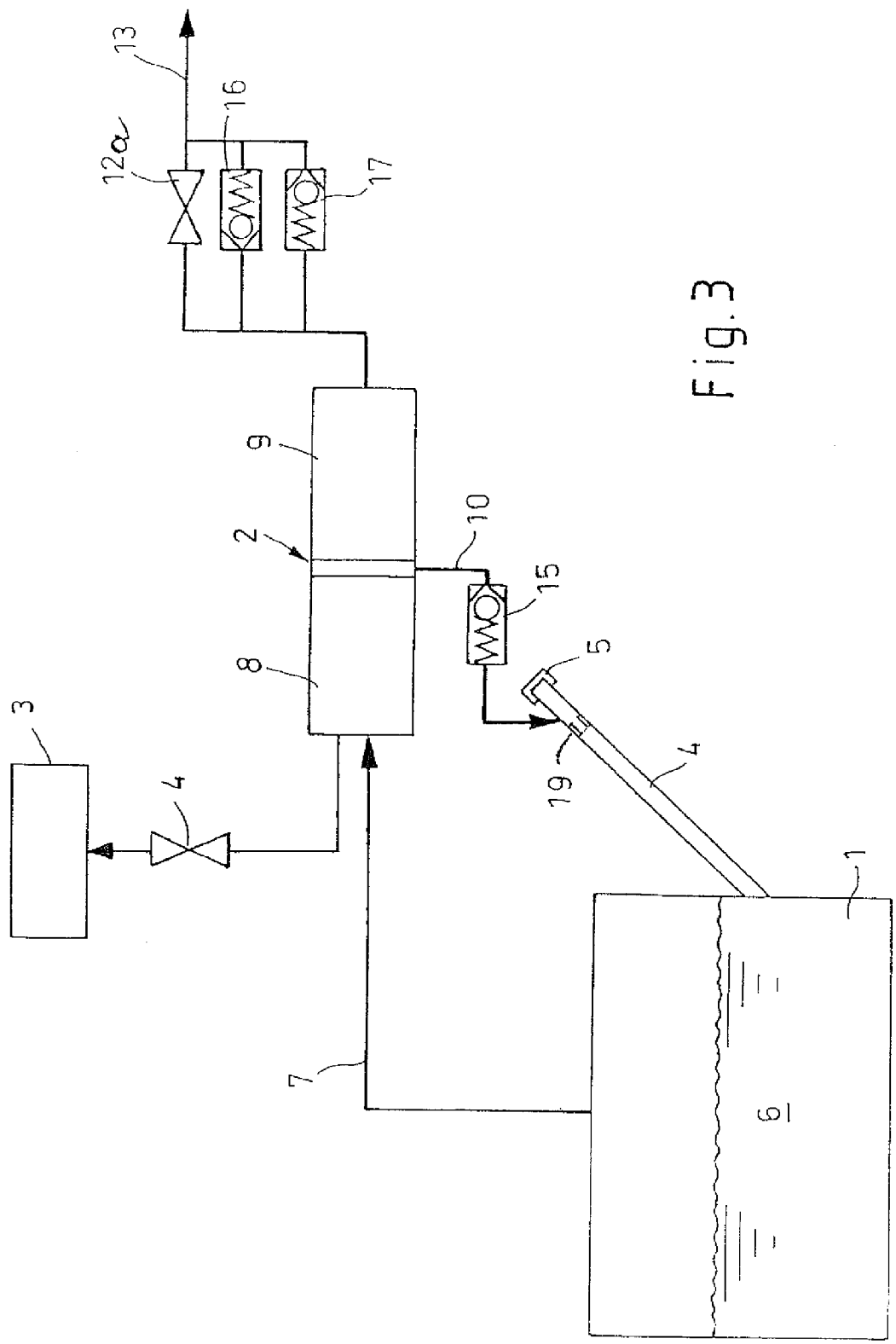
FIG. 3 shows the FIG. 2 embodiment with a modified OBD valve.

Reference is now made to FIG. 3 showing a layout which is not fundamentally different from that shown in FIG. 2. This arrangement only involves the diagnosis valve 12a in the operational venting conduit 13 being bridged over by a pressure-maintaining valve 16 which is connected in parallel relationship therewith. In this case the diagnosis valve 12a is closed in the non-powered condition whereas the diagnosis valve 12 in the arrangement described with reference to FIG. 2 is open in the non-powered condition. In the arrangement described with reference to FIG. 3 therefore the diagnosis valve 12a is firstly opened in the procedure for testing sealing integrity of the tank in order to put the fuel tank 1 into a pressure-less condition, that is to say at atmospheric pressure. The diagnosis valve 12a is then closed and the fuel tank 1 is put under an increased pressure or a reduced pressure to check the sealing integrity of the system. Otherwise the diagnosis valve 12a is closed.

Reference 17 in FIG. 3 denotes a further check valve which is connected in parallel relationship with the diagnosis valve 12a and in parallel relationship with the pressure-maintaining valve 16, in the refuelling venting conduit 13. That check valve 17 permits purging of the fuel vapor filter 2 against a slight counter-pressure.

At this juncture it should be mentioned once again that the drawing only represents diagrammatic configurations of the arrangement according to the invention, for example, and without limitation, the functions of the valves 12a, 16 and 17 can be combined in a single valve.

It will be appreciated that the above-described embodiments have been set forth solely by way of example and illustration of the principles of the present invention and that various modifications and alterations may be made therein without thereby departing from the spirit and scope of the invention.

What is claimed is:

1. A fuel tank for an internal combustion engine, comprising
    means for conveying fuel from the tank to an internal combustion engine,
    a filling connection with a filling opening,
    means for refuelling and operational venting of the tank,
    at least one fuel vapor filter by way of which venting of the tank is effected, the fuel vapor filter being a two-stage filter comprising first and second filter stages in the direction of flow in respect of venting, wherein the first filter stage is of a lower flow resistance therethrough than one of the group consisting of the first and second filter stages and the second filter stage, and a refuelling venting conduit branched off the fuel vapor filter after the first filter stage, wherein the refuelling venting conduit communicates with the filling connection.

2. A fuel tank as set forth in claim 1 wherein the second filter stage is in the form of a fine cleaning stage.

3. A fuel tank as set forth in claim 1 wherein the refuelling venting conduit has an outlet opening communicating with the atmosphere, and including a switchable refuelling valve operatively disposed between the first filter stage and the refuelling venting conduit outlet opening, the arrangement being such that the refuelling venting conduit is communicatable with the atmosphere by way of the refuelling valve.

4. A fuel tank as set forth in claim 3 wherein the refuelling valve is closed in the non-actuated condition.

5. A fuel tank as set forth in claim 1 and including
    an operational venting conduit connected to the second filter stage, and
    a switchable diagnosis valve connected to the operational venting conduit for communication with the atmosphere, the diagnosis valve being open in the non-actuated condition.

6. A fuel tank as set forth in claim 1 wherein the filling connection includes a sealing means adapted to sealingly co-operate with a refuelling gun and wherein the refuelling venting conduit communicates with the filling connection upstream of the sealing means in the direction of flow of fuel to be introduced into the fuel tank.

7. A fuel tank as set forth in claim 1 wherein the filling connection includes a holder adapted to co-operate with a refuelling gun and
    wherein the refuelling venting conduit communicates with the filling connection upstream of the holder in the direction of flow of fuel to be introduced into the fuel tank.

8. A fuel tank as set forth in claim 1 and further including a check valve in the refuelling venting conduit after the fuel vapor filter.

9. A fuel tank as set forth in claim 5 wherein the diagnosis valve is closed in the non-actuated condition, and further including a pressure-maintaining valve in parallel relationship with the diagnosis valve.

10. A fuel tank as set forth in claim 9 and further including a check valve in the operational venting conduit, the check valve being in parallel relationship with the pressure-maintaining valve.

* * * * *